US011884529B2

(12) United States Patent
Hayakawa

(10) Patent No.: US 11,884,529 B2
(45) Date of Patent: Jan. 30, 2024

(54) ASEPTIC FILLING APPARATUS AND METHOD FOR COOLING FILLING VALVE OF ASEPTIC FILLING APPARATUS

(71) Applicant: Dai Nippon Printing Co., Ltd., Tokyo (JP)

(72) Inventor: Atsushi Hayakawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 60 days.

(21) Appl. No.: 17/595,324

(22) PCT Filed: Jun. 3, 2020

(86) PCT No.: PCT/JP2020/021964

§ 371 (c)(1),
(2) Date: Nov. 15, 2021

(87) PCT Pub. No.: WO2020/250775

PCT Pub. Date: Dec. 17, 2020

(65) Prior Publication Data

US 2022/0212911 A1 Jul. 7, 2022

(30) Foreign Application Priority Data

Jun. 14, 2019 (JP) ................................ 2019-111029

(51) Int. Cl.

| | |
|---|---|
| ***B67C 3/22*** | (2006.01) |
| ***B65B 55/10*** | (2006.01) |
| ***B67C 7/00*** | (2006.01) |

(52) U.S. Cl.
CPC ................ *B67C 3/22* (2013.01); *B65B 55/10* (2013.01); *B67C 7/00* (2013.01); *B67C 2003/228* (2013.01)

(58) Field of Classification Search
CPC .......... B67C 3/005; B67C 3/001; B08B 9/023
See application file for complete search history.

(56) References Cited

U.S. PATENT DOCUMENTS

| | | | | |
|---|---|---|---|---|
| 2015/0298178 A1 | | 10/2015 | Hayakawa | |
| 2016/0046475 A1 | | 2/2016 | Hayakawa et al. | |
| 2018/0208446 A1 | * | 7/2018 | Hayakawa | B08B 3/02 |
| 2020/0048064 A1 | | 2/2020 | Hayakawa et al. | |
| 2020/0062566 A1 | | 2/2020 | Baumgartner et al. | |

FOREIGN PATENT DOCUMENTS

| | | | | | |
|---|---|---|---|---|---|
| EP | 2937309 A1 | * | 10/2015 | | B08B 9/027 |
| JP | H11-208782 A | | 8/1999 | | |
| JP | 2000-153245 A | | 6/2000 | | |
| JP | 2007-022600 A | | 2/2007 | | |
| JP | 2007-331801 A | | 12/2007 | | |

(Continued)

OTHER PUBLICATIONS

International Search Report and Written Opinion (Application No. PCT/JP2020/021964) dated Aug. 25, 2020 (with English translation).

(Continued)

*Primary Examiner* — Natasha N Campbell
(74) *Attorney, Agent, or Firm* — BURR PATENT LAW, PLLC

(57) ABSTRACT

A filling valve that has a high temperature due to an SIP is cooled in a short time. An aseptic water is blasted to an outer surface of the filling valve.

11 Claims, 2 Drawing Sheets

(56) References Cited

FOREIGN PATENT DOCUMENTS

| | | | |
|---|---|---|---|
| JP | 2010-189034 | A | 9/2010 |
| JP | 2014-055026 | A | 3/2014 |
| JP | 2014-189328 | A | 10/2014 |
| JP | 2017-047965 | A | 3/2017 |
| JP | 2018-052623 | A | 4/2018 |
| JP | 2018-177245 | A | 11/2018 |
| JP | 2018-184205 | A | 11/2018 |
| WO | 2018/104551 | A1 | 6/2018 |

OTHER PUBLICATIONS

Japanese Office Action (with English translation) dated Jun. 28, 2022 (Application No. 2021-089807).

* cited by examiner

ASEPTIC FILLING APPARATUS AND METHOD FOR COOLING FILLING VALVE OF ASEPTIC FILLING APPARATUS

TECHNICAL FIELD

The present invention relates to an aseptic filling apparatus that fills a container, such as a plastic bottle, a paper container, a cup, a tray or a pouch that is sterilized, with a food, a drink or the like that is sterilized in an aseptic atmosphere, and a method for cooling a filling valve of the aseptic filling apparatus.

BACKGROUND ART

An aseptic filling apparatus that aseptically fills a container, such as a plastic bottle, a paper container, a cup, a tray or a pouch, with a tea drink, mineral water, a juice, a soup, an energy drink, milk, a milk beverage, a sauce, a broth or the like is provided with, a sterilizing portion that sterilizes a container to be filled with a content, a rinsing portion that rinses the sterilized container, a filling portion that fills the sterilized container with a content sterilized by a content sterilization device, a sealing portion that seals the container filled with the content in an aseptic atmosphere and the like. These portions are arranged in chambers that shield the portions from the outside, and an aseptic atmosphere has to be maintained in each chamber during operation of the aseptic filling apparatus.

In the sterilizing portion, a nozzle that blasts gas or mist of hydrogen peroxide that is a sterilizer, or a mixture of the gas and mist to a container is disposed. The filling portion is provided with a content filling valve. In the case of a plastic bottle, a large number of content filling valves that rotationally moves around a wheel are provided. In the sealing portion that seals opening portions of the containers by lid members, cappers that screw caps onto bottle mouth portions are included when the containers are plastic bottles.

The content is supplied from a preparation apparatus to the filling valve of the filling portion through content supply piping, and the interior of the content supply piping is subjected to CIP (Cleaning In Place) to have remainder and foreign substances removed, and is further subjected to SIP (Sterilizing In Place) to be sterilized, regularly or when changing the kind of the contents (See Patent Literatures 1, 2, and 3, for example).

The CIP is performed by flowing a cleaning liquid containing water and an alkaline chemical agent as an additive, such as caustic soda, through a flow path from the interior of a pipe line of a content filling path to a filling valve of the filler, and thereafter flowing a cleaning liquid containing water and an acidic chemical agent as an additive. As a result of this, any remainder of the previously used content or the like adhering to the inside of the content filling path is removed.

The SIP is performed by, for example, flowing heated steam, hot water or the like through the inside of the flow path which has been cleaned by the above-described CIP. As a result of this, the interior of the content filling path is sterilized and brought into an aseptic state.

Droplets or the like of the content filled in the previous filling operation may adhere to the inside of the filling portion chamber that shields the filling portion of the aseptic filling apparatus and the sealing portion chamber that shields the sealing portion. When changing the kind of the filling content, the interior of the chamber is subjected to a COP (Cleaning Out of Place) in order to remove any droplets or the like of the content deposited on the inner wall of the chamber and the outer surface of the equipment, such as the filler, in the chamber in the previous filling operation. The COP is performed by spraying a shower of water containing an alkaline compound, an acidic compound or the like into the chamber, for example.

Further, since there is also a risk that bacteria enter the chamber during various operations when changing the kind of the content, an SOP (Sterilizing Out of Place) is also performed on the interior of the chamber. In a method of performing the SOP to the interior of a chamber, spaying of peracetic acid into the chamber, spraying of aseptic water into the chamber, blowing of heated air into the chamber, spraying of hydrogen peroxide into the chamber, and blowing of heated air into the chamber are sequentially performed (see Patent Literature 4).

Further, Patent literature 2 proposes an SOP for the interior of a chamber that includes a step of spraying hot water, a step of spraying heated peracetic acid-based sterilizer, and a step of rinsing by spraying heated aseptic water (see Patent Literature 5).

Patent Literature 4 proposes that after COP is performed by spraying an alkaline cleaner into a chamber and then spraying aseptic water, SOP is performed by sequentially performing spraying of peracetic acid, spraying of aseptic water, spraying of hydrogen peroxide, blowing of hot air, and blowing of cold air (see Patent Literature 6).

Normally, COP and SOP for the inside of the filling portion chamber are performed after CIP and SIP for the interior of the content supply piping are finished, but it is proposed to perform CIP and SIP for the interior of the content supply piping in parallel with COP and SOP for the inside of the filling portion chamber (See Patent Literatures 7 and 8).

CITATION LIST

Patent Literature

Patent Literature 1: Japanese Patent Laid-Open No. 2007-331801

Patent Literature 2: Japanese Patent Laid-Open No. 2000-153245

Patent Literature 3: Japanese Patent Laid-Open No. 2007-22600

Patent Literature 4: Japanese Patent Laid-Open No. H11-208782

Patent Literature 5: Japanese Patent Laid-Open No. 2010-189034

Patent Literature 6: Japanese Patent Laid-Open No. 2014-55026

Patent Literature 7: Japanese Patent Laid-Open No. 2014-189328

Patent Literature 8: Japanese Patent Laid-Open No. 2018-184205

SUMMARY OF INVENTION

Technical Problem

In an aseptic filling apparatus that fills a sterilized container with a sterilized content in an aseptic atmosphere and seals the container filled with the content, the SIP is performed for the interior of the content supply piping of the aseptic filling apparatus before starting production. Normally, the SIP is performed by flowing heated steam or hot water into the content supply piping.

In the aseptic filling apparatus, a content is subjected to heating sterilization and thereafter is cooled to a room temperature, and is filled in the container. The content supply piping of the aseptic filling apparatus that handles a large amount of content is provided with a sterilizing equipment. The sterilizing equipment includes an upstream side tank for storing a content such as a prepared drink, and a downstream side tank that stores a sterilized content and supplies the content to a filling valve. The upstream side tank and the downstream side tank are connected by a conduit that feeds a product liquid, a holding tube that sterilizes the content is provided in an intermediate portion of the conduit, heating portions that heat the content stepwise are provided over two stages in a location from the upstream side tank to the holding tube of the conduit, and cooling portions that cool the content stepwise are provided over three stages in a location to the downstream side tank from the holding tube of the conduit. By providing the heating portions and the cooling portions over a plurality of stages in this way, even a large-capacity content can be appropriately and smoothly heated to a sterilization temperature, and can be smoothly cooled to a room temperature.

Although the content is heated to be sterilized, the content is rapidly cooled to a room temperature after sterilization is finished. The cooled content is fed in the content supply piping to the filling valve and is filled in containers.

Before filling the containers with the content, the interior of the content supply piping is subjected to SIP. The SIP for the interior of the content supply piping is performed by flowing heated steam or hot water, and heating the interior of the content supply piping. When a pH of the content is 4.6 or higher, a temperature of the heated steam for performing SIP is approximately 130° C., and a temperature of the inside of the content supply piping is approximately 130°, though it depends on the content. In order to feed the content that is sterilized by the sterilizing equipment, and cooled to a room temperature to the filling valve, the interior of the content supply piping through which the content passes have to be cooled to a room temperature. The content supply piping is supplied with aseptic air and cooled.

The conduit and tanks are cooled in a short time period by supply of aseptic air because metals used therein are relatively thin. However, the filling valve is not easily cooled because an amount of metal that forms the filling valve is large and a heat capacity of the filling valve is large. It takes a long time to cool the filling valve that has a high temperature due to SIP to a room temperature, and a waiting time until start of production of the aseptic filling apparatus becomes long, which reduces productivity.

The present invention has an object to provide an aseptic filling apparatus that cools a filling valve that has a high temperature due to SIP in a short time period, and a method for cooling the filling valve of the aseptic filling apparatus.

Solution to Problem

A method for cooling a filling valve of an aseptic filling apparatus according to the present invention, the aseptic filling apparatus filling a sterilized container with a sterilized content in an aseptic atmosphere and sealing the container filled with the content, wherein an aseptic water is blasted to an outer surface of the filling valve that has a high temperature due to an SIP that is performed before an operation of the aseptic filling apparatus.

In the method for cooling a filling valve of an aseptic filling apparatus according to the present invention, the aseptic water is blasted to an outer surface of a content supply pipe for supplying the content to the filling valve.

In the method for cooling a filling valve of an aseptic filling apparatus according to the present invention, after the filling valve has a temperature equal to or lower than 120° C., the aseptic water is blasted to the outer surface of the filling valve.

In the method for cooling a filling valve of an aseptic filling apparatus according to the present invention, a temperature of the aseptic water is equal to or lower than 90° C.

In the method for cooling a filling valve of an aseptic filling apparatus according to the present invention, the SIP is performed by a heated steam.

In the method for cooling a filling valve of an aseptic filling apparatus according to the present invention, blasting the aseptic water is a part of a step of a COP or an SOP for an interior of a chamber where the filling valve is provided.

An aseptic filling apparatus according to the present invention is an aseptic filling apparatus for filling a sterilized container with a sterilized content in an aseptic atmosphere and sealing the container filled with the content, and includes an aseptic water blasting nozzle for blasting the aseptic water to an outer surface of a filling valve that has a high temperature due to an SIP that is performed before operation of the aseptic filling apparatus.

Advantageous Effects of Invention

According to the present invention, the temperature of the filling valve can be lowered in a short time period by blasting an aseptic water to the outer surface of the filling valve having a high temperature due to an SIP. As a result, a waiting time until production is shortened, and thereby productivity of the aseptic filling apparatus can be increased.

DESCRIPTION OF EMBODIMENT

Figure 1:
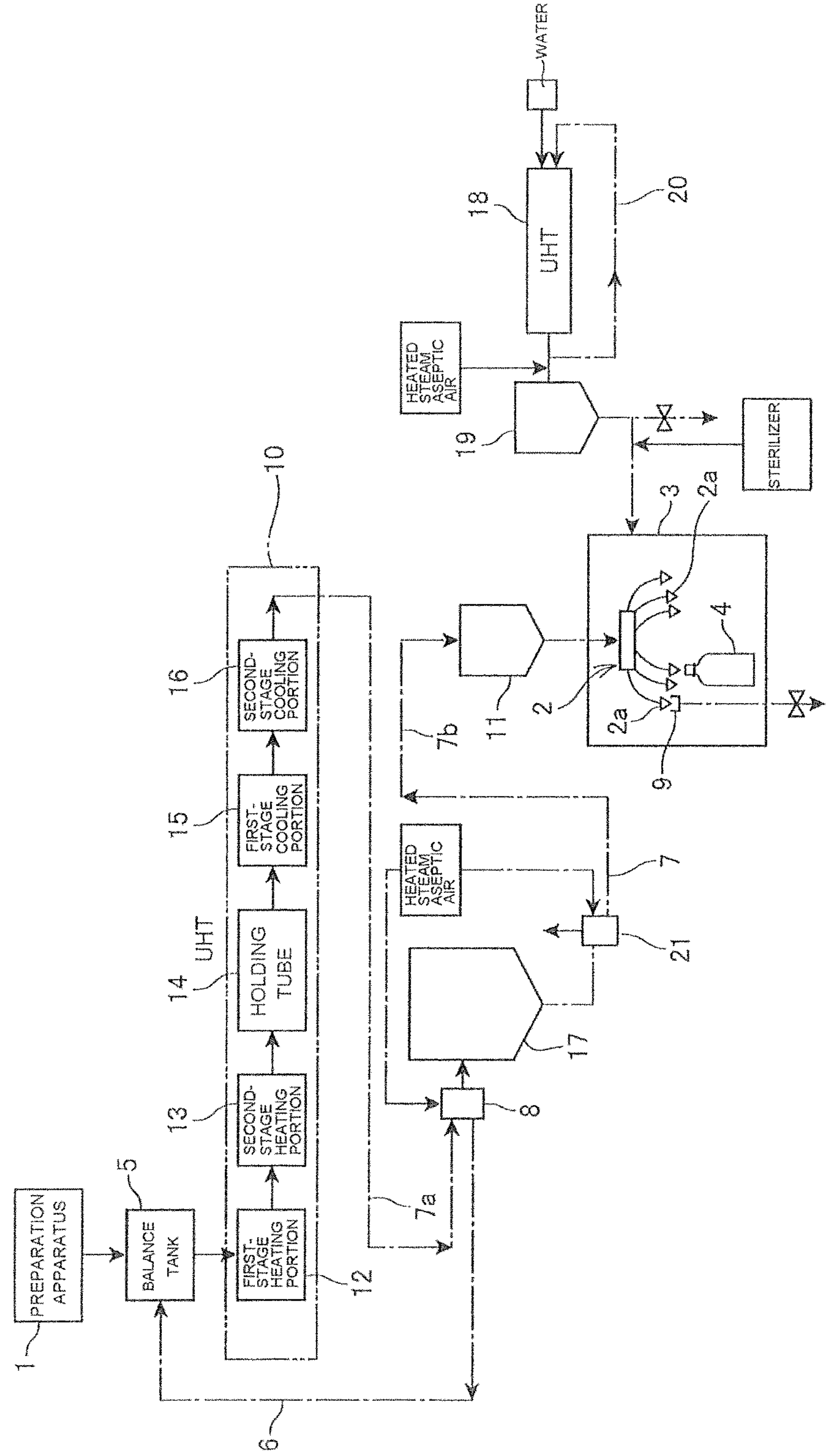
FIG. 1 shows content supply piping of an aseptic filling apparatus for bottles according to an embodiment of the present invention.

In general, an aseptic filling apparatus includes a sterilizing portion that receives a container supplied to the aseptic filling apparatus and sterilizes the supplied container, a filling portion that fills the sterilized container with a sterilized content in an aseptic atmosphere, and a sealing portion that seals the container filled with the content by a sterilized lid member in an aseptic atmosphere. However, the configuration of the aseptic filling apparatus varies depending on the container that is to be aseptically filled.

For example, when the container is a bottle, the aseptic filling apparatus includes a heating portion that receives a preform supplied to the aseptic filling apparatus and heats the preform to a molding temperature, a molding portion that molds the heated preform into a container, an inspecting portion that inspects the molded bottle, a bottle sterilizing portion that sterilizes the inspected bottle, an air-rinsing portion that air-rinses the sterilized bottle, a filling portion that fills the sterilized bottle with a content sterilized by a content sterilization device in an aseptic atmosphere, a sealing portion that seals the bottle filled with the content with a sterilized lid material in an aseptic atmosphere, and a discharging portion that discharges the sealed bottle. The aseptic filling apparatus for a bottle may not include the inspecting portion. There is an aseptic filling apparatus that has a preform sterilizing portion that sterilizes the supplied preform before heating. The aseptic filling apparatus having the preform sterilizing portion may not include the bottle sterilizing portion.

When the container is a paper container, the aseptic filling apparatus includes a bottom part forming portion that receives a sleeve supplied to the aseptic filling apparatus, sterilizes surfaces to be the outer surface of a paper container, and forms a bottom part, a sterilizing portion that sterilizes the inner surface of the paper container with the bottom part formed, a filling portion that fills the paper container with the inner surface sterilized with a sterilized content, and a sealing portion that seals the paper container filled with the content. Aseptic filling apparatuses for different containers have different configurations.

Each portion of the aseptic filling apparatus is shielded in a chamber. With the aseptic filling apparatus for a bottle, the heating portion and the molding portion may be shielded in a single chamber. The sealing portion and the discharging portion may also be shielded in a single chamber. Further, the filling portion, the sealing portion and the discharging portion may also be shielded in a single chamber.

With the aseptic filling apparatus for a paper container, the bottom part forming portion, the sterilizing portion, the filling portion and the sealing portion are shielded in a single chamber. However, the bottom part forming portion, the sterilizing portion, the filling portion and the sealing portion may be each shielded in a different chamber. The configuration of each portion varies depending on the container to be handled by the aseptic filling apparatus, and the chamber shielding each portion also varies depending on the container to be handled by the aseptic filling apparatus.

During operation of the aseptic filling apparatus for a bottle, aseptic air sterilized by a aseptic filter is supplied to the chamber for the bottle sterilizing portion, the chamber for the air rinsing portion, the chamber for the filling portion, the chamber for the sealing portion and the chamber for the discharging portion, and the aseptic condition of the aseptic filling apparatus is maintained by establishing a positive pressure in each chamber. The positive pressure established is the highest in the chamber for the filling portion and decreases as it goes upstream, specifically, is set to be lower in the chamber for the air rinsing portion and even lower in the chamber for the bottle sterilizing portion. For example, provided that the pressure in the chamber for the filling portion is 20 Pa to 40 Pa, the pressures in the other chambers are lower than the pressure in the chamber for the filling portion.

With the aseptic filling apparatus having a preform sterilizing portion, the heating portion and the molding portion are also each covered by a chamber, and aseptic air is supplied into the chamber for the heating portion and the chamber for the molding portion to maintain a positive pressure in the chambers.

In the aseptic filling apparatus for a bottle, a content is sterilized by the content sterilization device, the sterilized content is supplied to the filler, and the content is filled in the bottle from the filling valve of the filler. Content supply piping through which the content is supplied from the content sterilization device to the filling valve is shown in FIG. 1.

As shown in FIG. 1, the aseptic filling apparatus includes a preparation apparatus 1 for a content, and a filler 2 that fills a bottle 4 with the content. The preparation apparatus 1 and a filling valve 2*a* in the filler 2 are connected by content supply piping 7. Further, the filler 2 is enclosed by a filling portion chamber 3.

The preparation apparatus 1 is to prepare, for example, beverages such as a tea drink and a fruit beverage each in a desired compounding ratio and is a known device, and therefore, detailed explanation thereof will be omitted.

The filler 2 has many filling valves 2*a* disposed around a wheel (not illustrated) that rotates at a high speed within a horizontal plane, and is a machine for filling each bottle 4 that runs in synchronization with a peripheral speed of the wheel under the filling valves 2*a* with a fixed amount of the content from the filling valve 2*a* while causing the filling valves 2*a* to perform turning motion with rotation of the wheel. The filler 2 is also a known device, and therefore, detailed explanation thereof will be omitted.

The content supply piping 7 for the aseptic filling apparatus includes a balance tank 5, a content sterilization device 10, a manifold valve 8, an aseptic surge tank 17, and a filler tank 11, in order from an upstream side to a downstream side seen from a flow of the content, in a pipe line from the preparation apparatus 1 to the filler 2.

In the filling portion chamber 3 that shields the filling portion including the filler 2 of the aseptic filling apparatus, aseptic water is required to perform cooling of the filling valves 2*a*, to perform COP (Cleaning Out of Place) and SOP (Sterilizing Out of Place) to an inside of the filling portion chamber 3, to clean caps after sterilization, and to clean the outer surface of the bottle mouth portions after filling the content, so that the aseptic filling apparatus is equipped with an aseptic water production device 18. Aseptic water that is produced in the aseptic water production device 18 is stored in an aseptic water tank 19, and is supplied to the filling portion chamber 3. Aseptic water that is produced may be directly supplied to the filling portion chamber 3 when necessary while the aseptic water that is produced is circulated in a circulation path that is formed by the aseptic water production device 18 and an aseptic water return path 20 described later, without providing the aseptic water tank 19. Further, aseptic water may be produced before the content is sterilized by the content sterilization device 10, and may be supplied to the filling portion chamber 3, without providing the aseptic water production device 18.

The content sterilization device 10 includes therein a first stage heating portion 12, a second stage heating portion 13, a holding tube 14, a first stage cooling portion 15, a second stage cooling portion 16 and the like, and gradually heats a content or water that is supplied from the balance tank 5 while feeding the content or water from the first stage heating portion 12 to the second stage heating portion 13, heats the content or water to a target temperature in the holding tube 14, after which, the content sterilization device 10 feeds the content or water to the first stage cooling portion 15 and the second stage cooling portion 16 to gradually cool the content or water. The number of stages of heating portions and cooling portions are increased or decreased as necessary. Further, a homogenizer may be installed before or after the holding tube 14.

The aseptic water production device 18 has a same structure as the content sterilization device 10, includes therein a first stage heating portion, a second stage heating portion, a holding tube, a first stage cooling portion, a second stage cooling portion and the like, gradually heats water that is supplied while feeding the water from the first heating portion to the second heating portion, heats the water to a target temperature in the holding tube, and thereafter feeds the water to the first stage cooling portion and the second stage cooling portion to cool the water gradually. The number of stages of heating portions and cooling portions are increased or decreased as necessary. The aseptic water that is produced is stored in the aseptic water tank 19 once, and is supplied into the filling portion chamber 3 as necessary.

Since the balance tank 5, a manifold valve 8, the aseptic surge tank 17, the filler tank 11, a manifold valve 21 and the aseptic water tank 19 are all known devices, detailed explanation thereof will be omitted.

As shown in FIG. 1, in the content supply piping 7, an upstream side piping portion 7*a* that leads to the manifold valve 8 through the balance tank 5 and the content sterilization device 10 is provided with an upstream side return path 6, and thereby, a circulation path for performing SIP is formed.

When the container such as a plastic bottle is filled with the content from the filling valve 2*a*, the content in the balance tank 5 is sterilized by the content sterilization device 10 while being fed by pressure in the conduit to the aseptic surge tank 17. The content is heated to approximately 65° C. from a room temperature in the first stage heating portion 12 of the content sterilization device 10, is heated from approximately 65° C. to approximately 140° C. in the second stage heating portion 13, is subjected to sterilizing treatment by being heated to and held at approximately 140° C. for approximately 30 seconds to 60 seconds in the holding tube 14, after which, the content is cooled from approximately 140° C. to approximately 90° C. in the first stage cooling portion 15, is cooled from approximately 90° C. to approximately 45° C. in a second stage cooling portion 16, and is cooled from approximately 45° C. to approximately 30° C. in a third stage cooling portion not illustrated. In the aseptic surge tank 17, the content at 30° C. that flows from the third stage cooling portion is stored, the content is fed from the aseptic surge tank 17 to the filler tank 11, is further fed to the filling valve 2*a*, and is filled in many containers such as plastic bottles that run at a high speed, by the filler 2.

In the aseptic filling apparatus, CIP and SIP for the interior of the content supply piping 7 that supplies the content are performed before operation.

The aseptic filling apparatus is provided with a CIP equipment (not illustrated) that performs CIP for cleaning the interior of the content supply piping from the balance tank 5 to the filling valve 2*a*. In order to perform CIP, a cup-shaped switch body 9 is provided to open and close a mouth at the lower end of the filling valve 2*a*. Switch bodies 9 are arranged around the filler 2 shown in FIG. 1 in association with the respective grippers and filling valves 2*a*.

The switch body 9 can be moved by a cam device, an air cylinder device or the like in the radial direction and the vertical direction of the filler 2, and the switch body 9 is retracted inwardly in the radial direction when supplying the content from the filling valve 2*a* into the bottle 4, and is moved outwardly in the radial direction to directly below the filling valve 2*a* and then raised to block the mouth of the filling valve 2*a* when shielding the filling valve 2*a*.

Further, in addition to the switch bodies 9, components of the CIP equipment include a lower manifold, a lower rotary joint, a cleaning liquid tank, and a pump. The lower rotary joint is attached to a vertical shaft. The lower manifold is fixed to a base side. The switch bodies 9, the upper manifold, the lower manifold and the like are connected to each other by a pipe line. These components of the CIP equipment rotate along with the filler 2. Further, CIP for the content supply piping 7 may be performed by connecting the lower manifold and a CIP unit (not illustrated) outside the filling portion chamber 3 without providing the lower rotary joint.

CIP is performed by flowing a cleaning liquid into the content supply piping 7. The cleaning liquid that is supplied to the content supply piping 7 is flown to the filling valve 2*a* from the content sterilization device 10, and is recovered by the switch body 9 to circulate. The cleaning liquid may be circulated through the upstream side circulation path that circulates in the upstream side return path 6 from the content sterilization device 10 and the downstream side circulation path that circulates in the aseptic surge tank 17, the filler tank 11, and the filling valve 2*a* that are provided downstream of the content sterilization device 10 respectively.

As the cleaning liquid, there are alkaline cleaning liquids that contain desired alkaline components from a sodium hydroxide, potassium hydroxide, chlorinated alkali such as sodium hydrochrorite, and the like. The alkaline cleaning liquid may additionally contain a metal-ion blocking agent such as an alkali metal salt, an alkaline earth metal salt or an ammonium salt of an organic acid, or a hydroxycarboxylic acid compound such as an alkanolamine salt such as an ethylenediamine tetraacetic acid of an organic acid, an anionic surfactant, a cationic surfactant, a nonionic surfactant such as a polyoxyethylene alkylphenyl ether, a solubilizer such as sodium cumenesulfonate, an acid-based polymer such as polyacrylic acid or a metal salt of an acid-based polymer such as polyacrylic acid, a corrosion inhibitor, a preservative, an antioxidant, a dispersant, a defoaming agent or the like. As water for dissolving these substances, pure water, ion-exchanged water, distilled water, tap water or the like is used. Further, the cleaning liquid may contain various bleaches such as hypochlorite, hydrogen peroxide, peracetic acid, sodium percarbonate, and thiourea dioxide.

Cleaning liquids have detergency, but some cleaning liquids have sterilization properties depending on the composition. An appropriate temperature of the cleaning liquid to be circulated is 50° C. to 150° C. Detergency and sterilization properties are inferior at a temperature lower than 50° C., and a temperature increased to be higher than 150° C. is sufficient for detergency and sterilization properties, but difficult in the apparatus. Further, an appropriate time period for circulating the cleaning liquid is 5 minutes to 120 minutes, detergency is inferior when a time period is less than 5 minutes, and if the time period exceeds 120 minutes, detergency and sterilization properties are sufficient, but on the contrary, productivity is impaired.

After CIP by the alkaline cleaning liquid is performed, CIP by an acidic cleaning liquid having an acidic component may be performed. The acidic component is an inorganic acid such as hydrochloric acid, nitric acid or phosphoric acid, or an organic acid such as acetic acid, formic acid, octanoic acid, oxalic acid, citric acid, succinic acid or gluconic acid, and may contain an anionic surfactant, a cationic surfactant, a nonionic surfactant such as a polyoxyethylene alkylphenyl ether, a solubilizer such as sodium cumenesulfonate, an acid-based polymer such as polyacrylic acid, a corrosion inhibitor, a preservative, an antioxidant, a dispersant, a defoaming agent or the like.

After the cleaning liquid is circulated, rinsing for the interior of the content supply piping 7 and the interior of the circulation path is performed by water or aseptic water.

Aseptic water can be produced by heating water while passing the water in the content sterilization device 10 or the aseptic water production device 18.

After CIP, SIP for the interior of the content supply piping 7 is performed. SIP for the content sterilization device 10 is performed by circulating hot water heated by the content sterilization device 10 by passing the hot water from the upstream side piping portion 7*a* through the manifold valve 8, and through the upstream side return path 6. SIP for an interior of a downstream side piping portion 7*b* from the aseptic surge tank 17 to the filling valve 2*a* through the filler tank 11 is performed by suppling heated steam at 121.1° C. or higher and approximately 130° C. from the aseptic surge tank 17 via the manifold valve 8 and a manifold valve 21 when a pH of the content is 4.6 or higher. Further, heated steam may be supplied from the manifold valve 21, and may be supplied from the filler tank 11 to the filling valve 2*a*. SIP may be performed by hot water at 60° C. or higher when a pH of the content is lower than 4.0, and hot water at 85° C. or higher when a pH is 4.0 to less than 4.6. However, most of the contents that are filled by the aseptic filling apparatus have a pH of 4.6 or higher, and the filling valve 2*a* is heated to a high temperature by SIP by heated steam at approximately 130° C.

Heated steam that is supplied from the aseptic surge tank 17 reaches the filling valve 2*a*, and is directly discharged in the aseptic filling apparatus with a small number of filling valves 2*a*, but when many filling valves 2*a* are provided as in the aseptic filling apparatus for the bottles 4, pressure of the heated steam is reduced if the heated steam is directly discharged from the filling valves 2*a*, the temperature of the heated steam at a timepoint when reaching the filling valves 2*a* is reduced, and a sterilization time period becomes long. In order to prevent this, the switch body 9 is connected to a tip end of the filling valve 2*a*, heated steam discharged from all the filling valves 2*a* is aggregated, and an area of discharge ports is reduced, whereby a temperature of the heated steam reaching the filling valve 2*a* is adjusted.

After SIP is finished, the content that is cooled to a room temperature is fed to the filling valve 2*a* in the content supply piping 7 and is filled in the bottle 4. In order to fill the bottle 4 with the content, the filling valve 2*a* that has a high temperature due to SIP has to be cooled to a room temperature.

Figure 2:
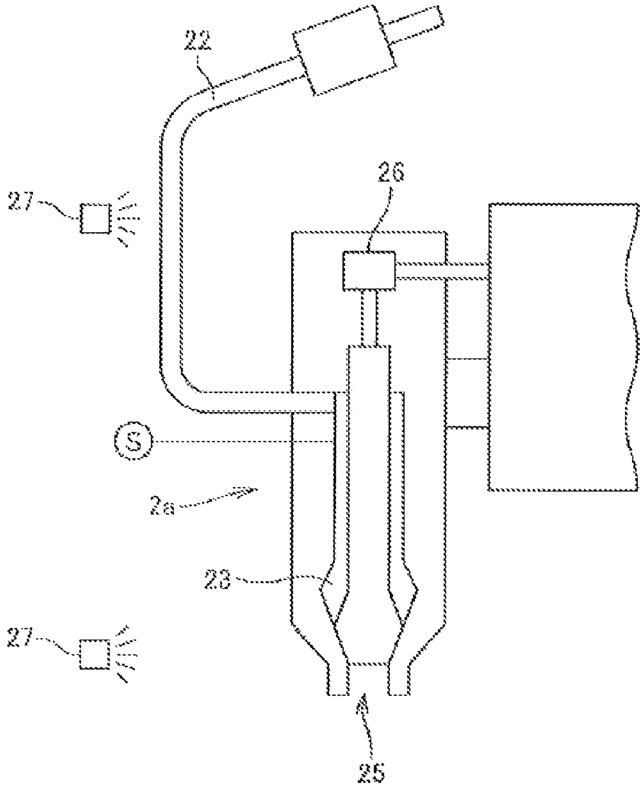
FIG. 2 is a view showing a state in which an aseptic water is blasted to an outer surface of a filling valve of the aseptic filling apparatus according to the embodiment of the present invention.

As shown in FIG. 2, aseptic air is supplied to a content supply pipe 22 of the filling valve 2*a* for which SIP is finished. The aseptic air that is supplied passes through a content filling passage 23 of the filling valve 2*a*, and is discharged from the tip end of the filling valve 2*a* that is opened by raising a liquid valve 25 by an opening and closing piston 26. By supply of aseptic air to the filling valve 2*a*, an aseptic condition of the inside of the filling valve 2*a* is maintained, and the filling valve 2*a* is cooled. However, even if aseptic air is supplied to the content supply pipe 22, the filling valve 2*a* is not easily cooled because the filling valve 2*a* is configured by many metal components, and has a large heat capacity.

Thus, as shown in FIG. 2, the filling valve 2*a* is cooled by blasting aseptic water to an outer surface of the filling valve 2*a* from an aseptic water blasting nozzle 27. Before the aseptic water is blasted, the filling valve 2*a* has a temperature equal to or lower than 120° C., and preferably equal to or lower than 100° C. by supply of the aseptic air. This is because there is a risk that the metal components configuring the filling valve 2*a* rapidly shrink and are damaged, by blasting the aseptic water to the filling valve 2*a* having a temperature higher than 120° C.

The temperature of the aseptic water to be blasted to the outer surface of the filling valve 2*a* is a room temperature to 90° C., and preferably equal to or less than 70° C. With a temperature higher than 90° C., a cooling capacity is insufficient, and with a temperature lower than the room temperature, there is a risk that the metal components rapidly shrink and are thereby damaged, although the cooling capacity is high.

After the filling valve 2*a* has a temperature equal to or less than 90° C. by blasting the aseptic water, blasting of the aseptic water is stopped. The SOP for the inside of the filling portion chamber 3 is finished, and the filling valve 2*a* is further cooled by aseptic air at a room temperature that is supplied into the filling portion chamber 3.

Further, in order to purge air that remains in the content supply piping 7 for which SIP is finished, the content at a room temperature is flown to the content supply piping 7, but the filling valve 2*a* is further cooled by the content at a room temperature flowing.

As the aseptic water, aseptic water produced by the content sterilization device 10 for which SIP is finished, or aseptic water produced by the aseptic water production device 18 included in the aseptic filling apparatus is used. The aseptic water produced in the aseptic water production device 18 is stored in the aseptic water tank 19, and supplied to the aseptic water blasting nozzle 27 from the aseptic water tank 19. The aseptic water may be water that is passed through a aseptic filter.

The aseptic water blasting nozzle 27 is provided around the filling valve 2*a*. The aseptic water blasting nozzle 27 may be any nozzle as long as aseptic water can reach the outer surface of the filling valve 2*a*. As the aseptic water blasting nozzle 27, a single-fluid nozzle or a twin-fluid nozzle using aseptic compressed air is used. One aseptic water blasting nozzle 27 may be used for one filling valve 2*a*, but cooling efficiency is improved by providing a plurality of aseptic water blasting nozzles 27. As in FIG. 2, a plurality of aseptic water blasting nozzles 27 may be provided with different heights or different blasting directions.

Figure 3:
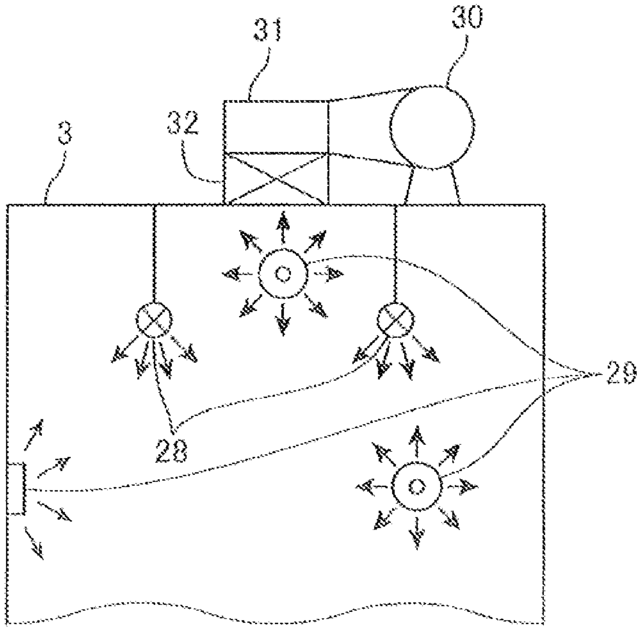
FIG. 3 shows an inside of a chamber of the aseptic filling apparatus according to the embodiment of the present invention.

The interior of the filling portion chamber 3 of the aseptic filling apparatus is subjected to COP and SOP before operation of the aseptic filling apparatus. As shown in FIG. 3, in the filling portion chamber 3 for the aseptic filling apparatus, a rotary nozzle 28 that sprays a sterilizer containing a cleaning liquid and peracetic acid and a twin-fluid nozzle 29 that sprays a sterilizer containing hydrogen peroxide are provided. The rotary nozzle 28 is a nozzle that sprays a liquid supplied thereto into the filling portion chamber 3 while being rotated by the pressure of the liquid being sprayed. The twin-fluid nozzle 29 is supplied with a sterilizer containing hydrogen peroxide and compressed air, and sprays the sterilizer containing hydrogen peroxide into the chamber 3 under the pressure of the compressed air. The nozzles provided in the filling portion chamber 3 are not limited to the rotary nozzle 28 and the twin-fluid nozzle 29, but can be any nozzle having a different structure that can spray a cleaner, a sterilizer containing peracetic acid, or a sterilizer containing aseptic water and hydrogen peroxide into the filling portion chamber 3.

The aseptic water blasting nozzle 27 may blasts a cleaning liquid, a sterilizer containing a peracetic acid, hydrogen peroxide or the like, and aseptic water as necessary, at the time of COP and SOP for the interior of the filling portion chamber 3. It is necessary to sterilize the pipe line to the aseptic water blasting nozzle 27 before blasting aseptic water to the outer surface of the filling valve 2*a* from the aseptic water blasting nozzle 27, and to this end, a sterilizer containing peracetic acid, hydrogen peroxide or the like is flown to the flow path for aseptic water to the filling portion chamber 3 from the content sterilization device 10 and the aseptic water production device 18, and the sterilizer may be blasted to the filling valve 2*a* from the aseptic water blasting nozzle 27.

When changing the content after a continuous operation of filling the bottles 4 with the content by the aseptic filling apparatus, or if the interior of the filling portion chamber 3 is contaminated with droplets of the content after a continuous operation for a long time, the operation of the aseptic filling apparatus is stopped, and COP and SOP for the interior of the filling portion chamber 3 of the aseptic filling apparatus are performed.

For the COP for cleaning the interior of the filling portion chamber 3 contaminated with the content, for example, an alkaline cleaning liquid is first sprayed into the filling portion chamber 3. The alkaline cleaning liquid contains an inorganic basic compound such as sodium hydroxide or potassium hydroxide, or an organic basic compound such as ethanolamine or diethylamine, and may further contain a metal-ion blocking agent such as an alkali metal salt, an alkaline earth metal salt, an ammonium salt, or ethylenediamine tetraacetic acid of an organic acid, or an anionic surfactant, a cationic surfactant, a nonionic surfactant such as a polyoxyethylene alkylphenyl ether, a solubilizer such as sodium cumenesulfonate, a metal salt of an acid-based polymer such as polyacrylic acid, a corrosion inhibitor, a preservative, an antioxidant, a dispersant, a defoaming agent or the like.

After the alkaline cleaning liquid is sprayed, an acidic cleaning liquid may be sprayed. The acidic cleaning liquid is an inorganic acid such as hydrochloric acid, nitric acid or phosphoric acid, or an organic acid such as acetic acid, formic acid, octanoic acid, oxalic acid, citric acid, succinic acid or gluconic acid, and may contain an anionic surfactant, a cationic surfactant, a nonionic surfactant such as a polyoxyethylene alkylphenyl ether, a solubilizer such as sodium cumenesulfonate, an acid-based polymer such as polyacrylic acid, a corrosion inhibitor, a preservative, an antioxidant, a dispersant, a defoaming agents or the like. When the contamination with the content remains after the spray of the alkaline cleaning liquid, the spray off the acidic cleaning liquid is performed. Alternatively, the spray of the alkaline cleaning liquid may be omitted, and only the spray of the acidic cleaning liquid may be performed. The spray of the alkaline cleaning liquid and the spray of the acidic cleaning liquid may be alternately performed repeatedly.

The cleaning may be performed using water at a room temperature, warm water or hot water, without using the alkaline cleaning liquid and the acidic cleaning liquid. Alternatively, after the cleaning with the alkaline cleaning liquid and the acidic cleaning liquid, the cleaning with water at a room temperature, warm water or hot water may be performed, which also serves to wash the alkaline cleaning liquid and the acidic cleaning liquid away. These cleaning liquids can be used in any combination in any order. Here, the warm water herein is water at a temperature equal to or higher than 40° C. and lower than 100° C., and the hot water herein is water at a temperature equal to or higher than 100° C. and equal to or lower than 130° C.

If the alkaline cleaning liquid is heated to 50° C. or higher, the alkaline cleaning liquid has a sterilizing effect. Therefore, by spraying the alkaline cleaning liquid heated to 50° C. or higher into the filling portion chamber 3, a sterilizing effect is also expected.

When the cleaning liquid is the alkaline cleaning liquid or acidic cleaning liquid, for example, the alkaline cleaning liquid or acidic cleaning liquid may be washed away by additionally using water at a room temperature, warm water or hot water as a cleaning liquid. Here, the water used may be aseptic water. In order to prevent the interior of the filling portion chamber 3 from being contaminated with bacteria contained in the water sprayed thereto, aseptic water is preferably used. If a sterilizer containing peracetic acid is used in the subsequent sterilizer spraying, the water may be tap water. This is because the sterilizer containing peracetic acid sterilizes any water remaining in the filling portion chamber 3.

The temperature of the water sprayed into the filling portion chamber 3 after the interior of the filling portion chamber 3 is cleaned with the alkaline cleaning liquid or acidic cleaning liquid is 20° C. to 100° C., preferably 60° C. to 100° C. By setting the temperature of the water to 60° C. or higher, not only the improvement of the cleaning ability but also a sterilizing effect against heat-resistant fungi and heat-resistant yeast damaged by chemical agents such as alkali used in the COP is expected.

The sterilizer is then sprayed to the interior of the filling portion chamber 3 to perform SOP for devices and the wall surface in the filling portion chamber 3. When a sterilizer containing hydrogen peroxide is sprayed, heated air is preferably blown into the filling portion chamber 3 to remove the remaining water before the sterilizer containing hydrogen peroxide is sprayed to prevent the concentration of hydrogen peroxide in the sterilizer containing hydrogen peroxide from decreasing because of the water remaining in the filling portion chamber 3 and decreasing the sterilizing effect.

After the cleaning liquid in the filling portion chamber 3 for which COP is performed by spraying the cleaning liquid is removed, the interior of the filling portion chamber 3 is subjected to SOP. As the SOP, after a sterilizer containing peracetic acid is sprayed into the filling portion chamber 3, aseptic water is sprayed to wash the sterilizer containing peracetic acid, a sterilizer containing hydrogen peroxide is then sprayed into the filling portion chamber 3, and thereafter the sterilizer containing hydrogen peroxide is removed by being dried.

Further, the sterilizer containing peracetic acid and the sterilizer containing hydrogen peroxide may be alternately sprayed. For example, the sterilizer containing peracetic acid is sprayed and then washed away with aseptic water, the aseptic water attached to conveyor devices is then removed by driving the conveyor devices that convey containers, and the sterilizer containing hydrogen peroxide is then sprayed and removed by being dried.

There is SOP that includes a step of spraying a sterilizer containing hydrogen peroxide, a step of removing the sterilizer containing hydrogen peroxide by drying the sterilizer, a step of spraying a sterilizer containing peracetic acid, and a step of washing the sterilizer containing peracetic acid away with aseptic water. The spray of the sterilizer containing peracetic acid and the spray of the sterilizer containing hydrogen peroxide may be alternately performed, or may be each performed multiple times.

The parts of the interior of the filling portion chamber 3 that come into contact with the sterilizer containing peracetic acid are perfectly sterilized by the sterilizer containing peracetic acid. However, there is a possibility that a small clearance into which the sterilizer cannot enter, a part the sprayed sterilizer cannot reach, or a part (such as a HEPA filter) that should not be actively sterilized with the sterilizer containing peracetic acid is not sterilized, or a peracetic acid-resistant bacterium (such as *Paenibacillus* or *Bacillus cereus*) is not killed. Therefore, in order to sterilize a small clearance into which the sterilizer containing peracetic acid cannot enter or a part that the sprayed sterilizer containing peracetic acid cannot reach, which can be left unsterilized by the sterilizer containing peracetic acid, with hydrogen peroxide gas produced from the sterilizer containing hydrogen peroxide, the spray of the sterilizer containing peracetic acid and the spray of the sterilizer containing hydrogen peroxide may be alternately performed.

The sterilizer containing peracetic acid herein is a sterilizer mainly composed of peracetic acid, and the concentration of peracetic acid is 500 ppm or higher, preferably from 1000 ppm to 5000 ppm. The sterilizer further contains at least hydrogen peroxide and acetic acid. If the sterilizer containing peracetic acid is heated to 40° C. to 95° C., preferably to 50° C. to 95° C., the sterilizing effect is improved.

After the sterilizer containing peracetic acid is sprayed into the filling portion chamber 3, aseptic water is sprayed into the filling portion chamber 3. By spraying aseptic water, the sterilizer containing peracetic acid is washed away from the interior of the filling portion chamber 3. The water used to wash the sterilizer containing peracetic acid away has to be aseptic water. This is intended to maintain the sterilized state by the sterilizer containing peracetic acid.

After the aseptic water is removed, a sterilizer containing hydrogen peroxide is sprayed into the filling portion chamber 3. Before spraying the sterilizer containing hydrogen peroxide into the filling portion chamber 3, the interior of the filling portion chamber 3 is preferably dried as much as possible. If the interior is wet, there is a possibility that the hydrogen peroxide be dissolved in the remaining aseptic water so that the concentration of hydrogen peroxide in the sterilizer decreases, and the sterilizing effect be not exerted.

After the aseptic water in the filling portion chamber 3 is removed, the sterilizer containing hydrogen peroxide is sprayed into the filling portion chamber 3. The sprayed sterilizer containing hydrogen peroxide appropriately contains 20 mass % to 65 mass % of hydrogen peroxide. If the content is less than 20 mass %, the sterilizing power may be insufficient, and if the content is more than 65 mass %, handling becomes difficult for safety reasons. By spraying the sterilizer containing hydrogen peroxide, any part that has not been sterilized by the spray of the sterilizer containing peracetic acid is sterilized, and any peracetic acid-resistant bacteria that has not been killed by the sterilizer containing peracetic acid is killed.

After spraying the sterilizer containing hydrogen peroxide into the filling portion chamber 3, heated aseptic air is blown into the filling portion chamber 3 in order to gasify the hydrogen peroxide and sterilize the interior of the chamber. The heated aseptic air is blown by heating air by a blower 30 with a heating apparatus 31, and supplying the heated aseptic air passing through an aseptic filter 32 into the filling portion chamber 3. The temperature of the heated aseptic air can be 50° C. to 200° C. By blowing the heated aseptic air into the filling portion chamber 3, the hydrogen peroxide in the sterilizer containing hydrogen peroxide remaining in the filling portion chamber 3 is gasified to sterilize any small clearance that the sterilizer containing peracetic acid has not been able to enter or any part that the sprayed sterilizer containing peracetic acid has not reached or kill any peracetic acid-resistant bacteria.

After it is checked that the sterilizer containing hydrogen peroxide in the filling portion chamber 3 has been removed by blowing the heated aseptic air into the filling portion chamber 3, the interior of the filling portion chamber 3 is ventilated and cooled by blowing aseptic air at a room temperature into the filling portion chamber 3 to remove any remaining hydrogen peroxide, and cool the interior of the filling portion chamber 3 having been heated by blowing of the heated aseptic air.

As described above, during the steps of COP and SOP, aseptic water may be sprayed into the filling portion chamber 3. SIP is performed according to the timing of aseptic water spray, and with the end of SIP, aseptic water may be blasted to the outer surface of the filling valve 2*a* at the time of aseptic water spray for the COP and SOP. It is possible to shorten a preparation time period before operating the aseptic filling apparatus by not only blasting aseptic water for the purpose of cooling the filling valve 2*a* but also blasting the aseptic water as the steps of COP and SOP.

In order to grasp the temperature of the filling valve 2*a*, the filling valve 2*a* is equipped with a thermometer S as shown in FIG. 2. It becomes possible to prevent aseptic water from being blasted to the filling valve 2*a* having a temperature higher than 120° C. while starting to feed aseptic water and completing cooling based on the temperature measured by the thermometer S and secure an appropriate cooling time period. Further, when all the filling valves 2*a* are equipped with the thermometers S, it is possible to recognize that a flow path to the aseptic water blasting nozzle 27 for the filling valve 2*a* that is not cooled may be closed. When the flow path to the aseptic water blasting nozzle 27 is closed, there is suggested a possibility that sterilization in the flow path to the aseptic water blasting nozzle 27 is insufficient. When aseptic water is blasted to the outside surfaces of the filling valves 2*a*, and there is the filling valve 2*a* that is not lowered in temperature, warning may be issued on an operation panel of the aseptic filling apparatus.

The aseptic filling apparatus for the bottles 4 is mainly described thus far, the filling valves 2*a* in the aseptic filling apparatus for containers such as a cup, a tray, a paper container or a pouch other than the bottle 4 can be similarly cooled. Many filling valves 2*a* for the bottles 4 are provided to be equally spaced around the filling portion. Since in the filler for cups, trays, or paper containers, the containers are conveyed in multiple rows, the same number of filling valves as the number of rows are provided. In the case of pouches, a form-fill-sealing machine has a single row, and an aseptic filling apparatus for bag products has a rotary type, but the number of filling valves is smaller as compared with that of the aseptic filling apparatus for the bottles 4. Regardless of the number of filling valves, it takes the same amount of time to cool the filling valves regardless of whether there are one or more filling valves, and the method for cooling a filling valve of the present invention is effective.

The method for cooling the filling valve 2*a* by blasting aseptic water to the outer surface of the filling valve 2*a* is described. The filling valve 2*a* may be indirectly cooled by blasting the aseptic water to the outer surface of the content supply pipe 22 at the upper part of the filling valve 2*a*, which is connected to the filling valve 2*a*, and conducting heat of the filling valve 2*a* to the content supply pipe 22. Alternatively, the cooling effect of the filling valve 2*a* may be enhanced by spraying aseptic water into the filling chamber 3, and lowering the environmental temperature in the filling portion chamber 3.

Although the present invention is configured as described above, the present invention is not limited to the embodiment described above, and various modifications are possible without departing from the scope and sprit of the present invention.

REFERENCE SIGNS LIST

2 filler
2*a* filling valve
3 filling portion chamber
7 content supply piping
10 content sterilization device
18 aseptic water production device
22 content supply pipe
23 content filling passage
25 liquid valve
27 aseptic water blasting nozzle
S thermometer

The invention claimed is:

1. A method for cooling a filling valve of an aseptic filling apparatus, the aseptic filling apparatus filling a sterilized container with a sterilized content in an aseptic atmosphere and sealing the container filled with the content, wherein, when a temperature of the filling valve is equal to or lower than 120° C. by supplying an aseptic air to a content supply pipe, an aseptic water is blasted to an outer surface of the filling valve that has a high temperature due to SIP that is performed before an operation of the aseptic filling apparatus, after the filling valve has a temperature equal to or less than 90° C. by blasting the aseptic water, blasting of the aseptic water is stopped, and the filling valve is further cooled by aseptic air at a room temperature that is supplied into a filling portion chamber where the filling valve is provided.

2. The method for cooling a filling valve of an aseptic filling apparatus according to claim 1, wherein the aseptic water is blasted to an outer surface of a content supply pipe for supplying the content to the filling valve.

3. The method for cooling a filling valve of an aseptic filling apparatus according to claim 2, wherein a temperature of the aseptic water is equal to or lower than 90° C.

4. The method for cooling a filling valve of an aseptic filling apparatus according to claim 2, wherein the SIP is performed by a heated steam.

5. The method for cooling a filling valve of an aseptic filling apparatus according to claim 2, wherein blasting the aseptic water is a part of a step of a COP or an SOP for an interior of a chamber where the filling valve is provided.

6. The method for cooling a filling valve of an aseptic filling apparatus according to claim 1, wherein a temperature of the aseptic water is equal to or lower than 90° C.

7. The method for cooling a filling valve of an aseptic filling apparatus according to claim 6, wherein the SIP is performed by a heated steam.

8. The method for cooling a filling valve of an aseptic filling apparatus according to claim 6, wherein blasting the aseptic water is a part of a step of a COP or an SOP for an interior of a chamber where the filling valve is provided.

9. The method for cooling a filling valve of an aseptic filling apparatus according to claim 1, wherein the SIP is performed by a heated steam.

10. The method for cooling a filling valve of an aseptic filling apparatus according to claim 9, wherein blasting the aseptic water is a part of a step of a COP or an SOP for an interior of a chamber where the filling valve is provided.

11. The method for cooling a filling valve of an aseptic filling apparatus according to claim 1, wherein blasting the aseptic water is a part of a step of a COP or an SOP for an interior of a chamber where the filling valve is provided.

* * * * *